United States Patent [19]
Harris et al.

[11] Patent Number: 5,791,507
[45] Date of Patent: Aug. 11, 1998

[54] QUICK-ON CAP WITH TWO-PART CLOSURE BODY

[75] Inventors: Robert S. Harris; Jeffery Griffin; Nancy J. Amburgey, all of Connersville, Ind.

[73] Assignee: Stant Manufacturing Inc., Connersville, Ind.

[21] Appl. No.: 759,414

[22] Filed: Dec. 4, 1996

Related U.S. Application Data

[60] Provisional application No. 60/007,945, Dec. 4, 1995.

[51] Int. Cl.$^6$ ................................................. B65D 51/16
[52] U.S. Cl. ................... 220/203.26; 220/295; 220/300; 220/304; 220/DIG. 33
[58] Field of Search .................. 220/203.23, 203.26, 220/300, 304, 295, DIG. 33

[56] References Cited

U.S. PATENT DOCUMENTS

| | | |
|---|---|---|
| 1,738,893 | 12/1929 | Grady . |
| 2,964,214 | 12/1960 | Stannard . |
| 2,990,971 | 7/1961 | Enell . |
| 3,006,499 | 10/1961 | Corbett . |
| 3,111,239 | 11/1963 | Ivins . |
| 3,813,904 | 6/1974 | Wallskog . |
| 3,820,680 | 6/1974 | Friend . |
| 3,938,692 | 2/1976 | Crute . |
| 3,985,260 | 10/1976 | Evans . |
| 4,000,633 | 1/1977 | Evans . |
| 4,102,472 | 7/1978 | Sloan, Jr. . |
| 4,162,021 | 7/1979 | Crute . |
| 4,294,376 | 10/1981 | Keller . |
| 4,337,873 | 7/1982 | Johnson . |
| 4,339,055 | 7/1982 | Hutzenlaub . |
| 4,436,219 | 3/1984 | Reutter . |
| 4,498,493 | 2/1985 | Harris . |
| 4,540,103 | 9/1985 | Kasugai et al. . |
| 4,572,396 | 2/1986 | Kasugai et al. . |
| 4,676,390 | 6/1987 | Harris . |
| 4,676,393 | 6/1987 | Daniel . |
| 4,678,097 | 7/1987 | Crute . |
| 4,726,488 | 2/1988 | Kasugai . |
| 4,765,505 | 8/1988 | Harris . |
| 4,779,755 | 10/1988 | Harris . |
| 4,795,053 | 1/1989 | Kasegai et al. . |
| 4,795,054 | 1/1989 | Brown . |
| 4,887,733 | 12/1989 | Harris . |
| 5,108,001 | 4/1992 | Harris . |
| 5,110,003 | 5/1992 | MacWilliams . |
| 5,381,919 | 1/1995 | Griffin et al. . |
| 5,385,256 | 1/1995 | Brown . |
| 5,395,004 | 3/1995 | Griffin et al. . |
| 5,480,055 | 1/1996 | Harris et al. ............. 220/203.26 |
| 5,540,347 | 7/1996 | Griffin ...................... 220/203.23 |

FOREIGN PATENT DOCUMENTS

| | | |
|---|---|---|
| 56-147868 | 3/1983 | Japan . |
| 1 420 252 | 1/1976 | United Kingdom . |

*Primary Examiner*—Stephen Cronin
*Attorney, Agent, or Firm*—Barnes & Thornburg

[57] ABSTRACT

A cap is provided for use in the filler neck of a tank. The cap includes a handle, an o-ring sealing gasket, and a closure body including an upper body portion coupled to the handle and a lower body portion rotatably coupled to the upper body portion for rotation about an axis of rotation. The o-ring sealing gasket is mounted on the lower body portion for movement therewith.

16 Claims, 8 Drawing Sheets

QUICK-ON CAP WITH TWO-PART CLOSURE BODY

BACKGROUND AND SUMMARY OF THE INVENTION

This is a continuation of U.S. Provisional Application No. 60/007,945, filed on Dec. 4, 1995.

The present invention relates to a cap for closing the mouth of a filler neck, and in particular, to a quick-on fuel cap for closing the filler neck of a vehicle fuel tank. More particularly, the present invention relates to a cap including an attachment mechanism for enabling a user to attach the cap to the filler neck quickly and easily and establish a sealed connection between the cap and the filler neck.

Conventional fuel caps for closing the filler neck of a vehicle fuel tank typically include a closure member for closing the mouth of the filler neck and a handle for turning the closure member to mount the closure member in the filler neck. Partial-turn cam-on caps and multiple-turn threaded caps are well-known types of caps for use in closing filler necks. Although such caps are currently in widespread use, it would be desirable to provide an alternative cap that is simpler to install on and remove from a filler neck.

It is known to provide a cam-on cap of the type having a shank portion which extends into the filler neck and is provided with pairs of conventional circumferentially spaced-apart cam lugs as disclosed in U.S. Pat. No. 4,887,733 to Harris. These cam lugs operate in the customary way to engage a filler neck configured to receive a cam-on cap and retain the cap in a fully tightened position closing the open mouth of the filler neck.

Alternatively, a conventional multiple-turn cap includes a closure member that is threaded to be screwed into a threaded filler neck. For example, U.S. Pat. No. 3,820,680 to Friend discloses a multiple-turn threaded cap and a compatible threaded filler neck. Typically, a multiple-turn threaded cap must be turned at least two and one-half or three full revolutions by the user after it is inserted into the threaded filler neck to connect the cap to the filler neck and establish a liquid and vapor seal between the cap and the filler neck.

More and more vehicle drivers are using the self-service bays at gasoline stations and filling their own fuel tanks. Some people have found that it is difficult to remove and install a conventional filler neck cap during refueling. A cap that is readily installable on and removable from a filler neck by a user without a lot of effort and that is configured to establish a sturdy sealed connection between the cap and the filler neck consistently during use would be a welcomed improvement over conventional caps.

It is known to provide a filler neck cap for which it is only necessary for the user to move the handle cover of the cap a small amount relative to the filler neck to tighten or loosen the cap during refueling. See, for example, U.S. Pat. Nos. 5,381,919 and 5,395,004 to Griffin et al. Typically these caps include a partial turn-to-remove feature which allows the user to slide the cap out of the filler neck easily rather than requiring the user to turn the entire cap in the filler neck one or more revolutions.

One problem with many conventional filler neck caps is that, because the handle is directly connected to the filler neck closure, any unintentional movement of the handle in the cap-removal direction will break the seal between the closure and the filler neck. Once the seal between the closure and the filler neck is broken, it is possible for fuel or fuel vapor to escape from the filler neck. In some instances, such as during a vehicle accident, a release of fuel or fuel vapor can potentially create a hazardous condition.

It is known to provide a filler neck cap having a lost-motion driving connection between the handle and the closure. See, for example, U.S. Pat. Nos. 4,765,505 to Harris and 5,520,300 to Harris. These caps are designed to allow the cap handle to rotate freely relative to the closure in both the cap-installation direction and the cap-removal direction.

In some cases, a user might be inconvenienced by a cap that provides a lost-motion driving connection during cap installation as well as during cap removal. It is known to provide a filler neck cap having a lost-motion driving connection between the handle and the closure during cap removal and that is automatically set to have a direct-drive driving connection between the handle and closure during cap installation. See, for example, U.S. Pat. No. 5,480,055 to Harris and Griffin.

Filler neck caps that include a sealing mechanism for establishing a liquid fuel and vapor seal between the filler neck and the sealing mechanism are often configured to ensure that the seal remains intact in the event of trauma such as an impact that might result if the vehicle is involved in a collision. See, for example, U.S. Pat. No. 4,678,097 to Crute disclosing a fuel cap including a flange having a frangible section that allows the handle shell to separate from the closure and sealing ring so that the seal remains intact in the event of such an impact. See also U.S. Pat. No. 5,381,919 to Griffin et al. disclosing a seal ring positioned at an axially inner surface on the closure engaging an axially outwardly-facing sealing surface of the filler neck so that the seal is axially compressed therebetween forming the seal at a position axially within the filler neck.

What is needed is a fuel cap providing a quick-on installation and removal mechanism allowing the user to move the handle a minimum angular distance to tighten or loosen the cap during refueling. Users will appreciate a quick-on fuel cap configured to minimize wear of the O-ring sealing gasket over an extended period of use including repeated installations and removals of the cap from the filler neck.

According to the present invention, a cap is provided for use in the filler neck of a tank. The cap includes a handle, an O-ring sealing gasket, and a closure body including an upper portion coupled to the handle and a lower portion rotatably coupled to the upper portion for rotation about an axis of rotation. The O-ring sealing gasket is mounted on the lower portion for movement therewith.

The closure body further includes an anti-rotation latch appended to the upper portion. The lower portion is formed to include spaced-apart first and second latch-receiving notches. The anti-rotation latch is configured to engage the first latch-receiving notch to establish a first position of the upper portion relative to the lower portion. The anti-rotation latch is also configured to engage the second latch-receiving notch following predetermined rotation of the upper portion relative to the lower portion about the axis of rotation to establish a second position of the upper portion relative to the lower portion.

In preferred embodiments, the closure body includes two anti-rotation latches and each anti-rotation latch includes a curved deflectable arm having a first end appended to the upper portion and a distal second end. The lower portion is formed to include a set of first and second latch-receiving notches for each of the anti-rotation latches appended to the rotatable upper portion. Each anti-rotation latch further includes an anti-rotation finger appended to the distal second end and oriented to extend downwardly in a direction parallel to the axis of rotation to engage the first latch-receiving notch upon movement of the upper portion relative to the lower portion to assume the first position and to engage the second latch-receiving notch upon movement of the upper portion relative to the lower portion to assume the second position.

The axially lower portion includes an annular surface facing toward the axially upper portion and engaging the anti-rotation latches during rotation of the upper portion relative to the lower portion. The annular surface is formed to include the two sets of first and second latch-receiving notches. Each second latch-receiving notch is positioned to lie in circumferentially spaced-apart relation to a companion first latch-receiving notch.

The axially lower portion includes a top wall and at least three annular segments appended to the top wall and arranged to define said annular surface facing toward the axially upper portion. A first and second of the three annular segments are arranged in spaced-apart relation to define a first latch-receiving notch therebetween. The second and a third of the three segments are arranged in spaced-apart relation to define a second latch-receiving notch therebetween.

The closure body further includes closure retainer apparatus (e.g., a pair of circumferentially spaced-apart retainer lugs) appended to the axially upper portion and configured to engage the filler neck to block removal of the closure body from the filler neck upon installation of the cap in the filler neck. The axially upper portion includes a cylindrical body having an axially upper end, an axially lower end, and a middle portion therebetween. The anti-rotation latches are appended to the axially lower end. The closure retainer apparatus is appended to the middle portion. The axially upper portion further includes an axially outer flange coupled to the axially upper end of the cylindrical body and to the handle.

The axially outer flange is formed to include an annular slot. The handle is rotatable about the axis of rotation and includes a wall and a drive lug coupled to the wall and arranged to extend into the annular slot to engage the axially outer flange at a first driven surface. The cap further includes a torsion spring coupled to the handle and to the axially upper portion to yieldably urge the drive lug of the handle in the annular slot into engagement with the first driven surface of the axially outer flange to establish a direct-drive driving connection between the handle and the closure body during cap installation.

The axially lower portion of the closure body is formed to include an annular channel containing the O-ring sealing gasket and lying in axially spaced-apart relation to the overlying closure retainer apparatus appended to the middle portion. The O-ring sealing gasket is positioned to slidingly engage the filler neck as the closure body is moved into the filler neck with minimum rotation of the sealing gasket during installation to minimize abrasion of the sealing gasket.

The cap is anchored to the filler neck by closure retainer apparatus that is appended to the middle portion of the closure body and positioned to lie between the handle and the O-ring sealing gasket. This arrangement allows the O-ring sealing gasket to be placed axially inwardly a predetermined distance into the filler neck and away from the mouth of the filler neck to minimize disruption of the seal that might occur in the event of a vehicle collision or undesirable impact to a portion of the vehicle adjacent to the filler neck.

During cap installation, the user always turns the closure body in the filler neck in a cap-installation or cap-advancing direction directly by turning the handle about its axis of rotation. The cap is called a "quick-on" cap because a user need only turn the handle a fraction of a turn in a clockwise direction once the cap is inserted into the filler neck to anchor the cap in a sealed filler neck closing position. During cap removal, the user turns the closure body in the filler neck in an opposite cap-removal direction. In either case, rotation of the handle relative to the underlying closure body does not cause the O-ring sealing gasket carried on the axially lower portion of the closure body to be scuffed or abraded by engagement with the filler neck.

The filler neck is formed to receive and engage the closure retainer apparatus appended to the middle portion of the closure body. The filler neck is also formed to engage the O-ring sealing gasket to establish a sealed connection between the cap and the filler neck at a point below the point at which the closure retainer apparatus engages the filler neck.

Additional features and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 5a is a partial view of an alternate embodiment of the filler neck including a helical slot for receiving a helical retaining lug (not shown) on an upper portion of a closure body in the cap;

DETAILED DESCRIPTION OF THE DRAWINGS

A quick-on cap in accordance with the present invention can be installed on a compatible filler neck by inserting the closure body of the cap into the mouth of the filler neck and turning the handle cover of the cap 30° in a clockwise cap-advancing direction. To remove the cap, the handle cover is rotated through a 60° first lost-motion stage angle relative to the mounted sealed closure body in a counterclockwise cap-removal direction and then the handle cover and closure body are rotated together as a unit through a 30° second direct-drive stage angle relative to the filler neck also in a counterclockwise cap-removal direction. Once removed from the filler neck, the cap automatically resets itself in the manner described below so that a direct-drive driving connection is established between the handle cover and the closure body during cap installation.

Advantageously, the closure body is rotated relative to the handle cover automatically after removal of the cap from the filler neck by an innovative cap control means so that a lost-motion driving connection is not present and apparent to a user during installation of the cap in the filler neck. Further, this direct-drive driving connection exists before and during cap installation without disrupting a lost-motion driving connection that is established between the handle cover and the closure body during an initial stage of cap removal.

Figure 1:
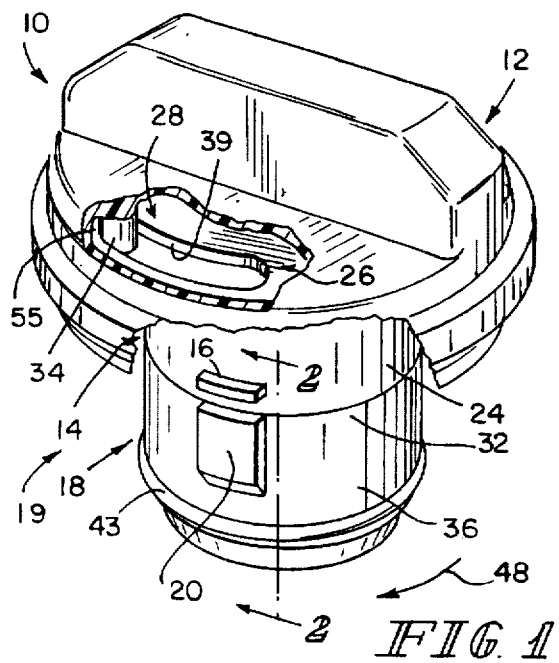
FIG. 1 is a perspective view of a quick-on cap according to the present invention showing the configuration of the cap before it is installed in a filler neck and showing a two-part closure body including a lower portion carrying an anti-rotation rib and an upper portion carrying a retaining lug and showing a handle cover, with portions broken away, to reveal a cylindrical drive lug appended to the handle cover and arranged to extend downwardly into an annular lost-motion drive slot formed in the underlying closure body and engage a drive wall in the closure body so that a direct-drive driving connection is established between the handle cover and the filler neck closure body.

A quick-on cap 10 in accordance with the present invention is shown in FIG. 1 as it would appear to a user about to insert cap 10 into a filler neck. Cap 10 includes a handle cover 12, a sleeve 14 having two radially outwardly projecting, and circumferentially spaced-apart annular retaining lugs 16, and a core 18 having two radially outwardly projecting and circumferentially spaced-apart anti-rotation ribs 20. The sleeve 14 and the core 18 cooperate to define a two-part closure body 19 underneath handle cover 12. Thus sleeve 14 functions as an upper portion of closure body 19 and core 18 functions as a lower portion of closure body 19.

Figure 2:
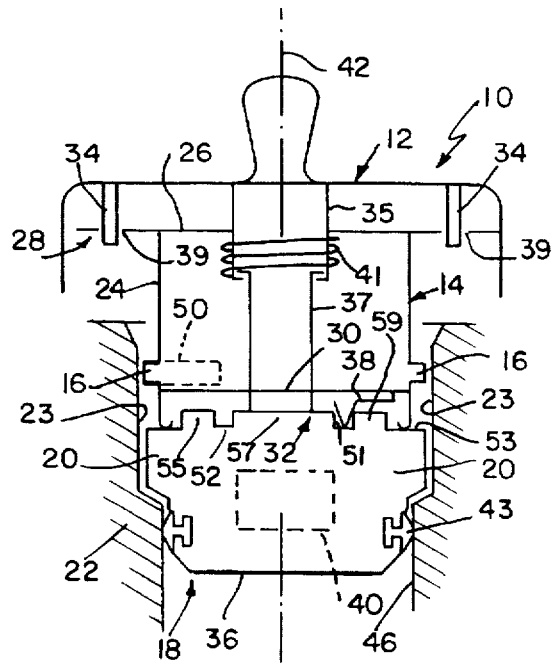
FIG. 2 is a diagrammatic view of the cap of FIG. 1 in a "sealed" but loosened position just after it has been inserted into a filler neck showing a torsion spring having a top finger coupled to the handle cover, a bottom finger coupled to the closure body, and a coiled portion interconnecting the top and bottom fingers, an O-ring sealing gasket engaging and sealing against an interior wall of the filler neck, placement of the anti-rotation ribs on the lower portion of the closure body and the retaining lugs on the upper portion of the closure body in vertical guide channels formed in the filler neck, and placement of an anti-rotation latch appended to the upper portion of the closure body in a first notch formed in the lower portion of the closure body to limit rotation of the upper portion relative to the lower portion during axial insertion of the cap into the filler neck.

Initially, as shown in FIG. 1, the retaining lugs 16 are axially aligned in vertical alignment with the anti-rotation ribs 20 to permit a user to insert the cap 10 into the filler neck 22 shown diagrammatically in FIG. 2. This filler neck 22 is formed to include two circumferentially spaced-apart, axially extending vertical guide channels 23 for receiving the two aligned pairs of retaining lugs 16 and anti-rotation ribs 20 during insertion of cap 10 into filler neck 22.

It will be appreciated that the axially extending vertical guide slots 23 in the filler neck 22 for receiving the two aligned pairs of retaining lugs 16 and anti-rotation ribs 20 during insertion of cap 10 into the filler neck constitute a gripping portion of the filler neck 22 disposed axially inwardly from the mouth internally in the neck. This gripping portion internally in the filler neck may take any number of forms including radially-inwardly extending abutments or flanges. The anti-rotation ribs 20 constitute means for engaging such filler neck channels, abutments, or flanges to prevent rotation of the core 18 in the filler neck 22. Similarly, the spaced-apart retaining lugs 16 on the sleeve 14 constitute means for engaging various internal filler neck abutments or flanges to prevent axial outward movement of the cap 10 from the filler neck 22. It will be appreciated that such engaging means, i.e. corresponding to the retaining lugs 16, may take any number of forms to cooperate with such internal abutments or flanges in the filler neck.

Essentially, therefore, the quick-on cap 10 of the present invention includes means for engaging the core 18 to the filler neck 22 to permit axial insertion and axial movement of the core 18 in the filler neck 22 but not rotation of the core 18 within the filler neck 22 as well as means for engaging the sleeve 14 with the filler neck 22 once the sleeve 14 is rotated in a cap-installation direction relative to the core 18 to prevent axial outward movement of the cap 10 from the filler neck 22.

Figure 4:
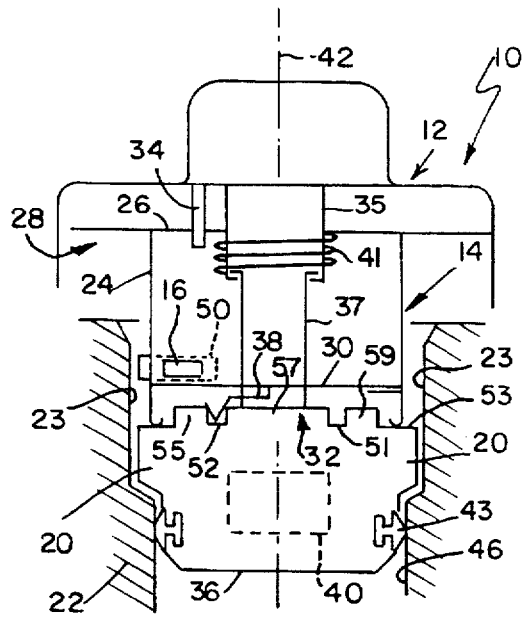
FIG. 4 is a diagrammatic view of the cap of FIG. 3 in place in the filler neck showing radial compression of the O-ring sealing gasket carried on the lower portion of the closure body between an annular inner wall of the filler neck and the lower portion of the closure body, the position of a "left-side" retaining lug on the upper portion of the closure body after it has been rotated out of a "left-side" vertical guide channel into engagement with an internal flange (dotted lines) formed in the filler neck, and placement of the anti-rotation latch engagement with a second notch formed in the lower portion of the closure body to limit rotation of the upper portion relative to the lower portion.

As shown diagrammatically in FIGS. 2 and 4, the sleeve 14 includes a cylindrical body 24 including a radially outwardly extending annular top flange 26 at the outer end 28 and a radially inwardly extending annular bottom flange 30 at the inner end 32. A pair of annular circumferentially spaced-apart anti-rotation latches 38 are appended to the annular bottom flange 30 of sleeve 14 to engage a portion of sleeve 14.

As shown diagrammatically in FIGS. 2 and 4, sleeve 14 is coupled to handle cover 12 by coupling means (described in detail below) so that the sleeve 14 will rotate about its axis 42 in response to manual rotation of handle cover 12 about axis 42 during installation and (a second stage of) removal of filler neck cap 10. Core 18 is blocked from rotating about axis 42 during installation and removal of cap 10 because of engagement of anti-rotation ribs 20 in vertical guide channels 23 formed in filler neck 12.

Figure 6:
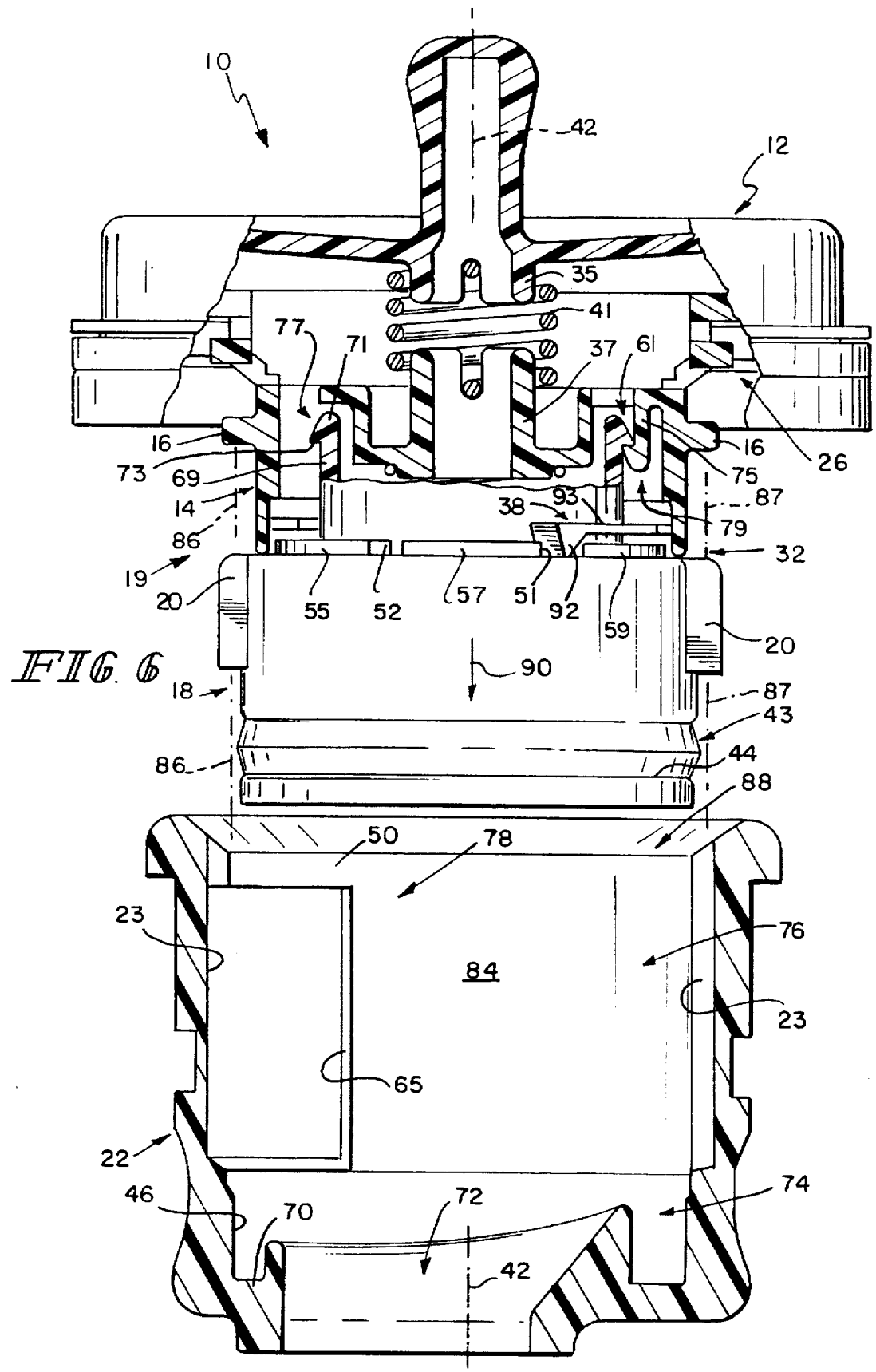
FIG. 6 is a sectional view of the quick-on cap of FIG. 5 (after it has been assembled), with portions broken away, as it is about to be inserted into the filler neck to cause the two anti-rotation ribs formed on the lower portion of the closure body and the two retaining lugs formed on the upper portion of the closure body to slide into the two vertical guide channels formed in the filler neck and showing an undercut formed in the filler neck to define an internal horizontal flange for engaging one of the retaining lugs formed on the upper portion of the closure body upon rotation of the handle cover and the upper portion of the closure body as a unit to a fully installed position in the filler neck.

As shown diagrammatically in FIGS. 2 and 4, core 18 includes a valve housing 36 containing a pressure-relief and vacuum-relief valve assembly 40. A bottom spring mount 37 is appended to sleeve 14 (as shown in FIG. 6) and arranged to overlie the top of valve housing 36. A pair of cylindrical drive lugs 34 are appended to the underside of handle cover 12 and arranged to extend into lost-motion drive slots 39 formed in top flange 26 of core 18. A top spring mount 35 is also appended to the underside of handle cover 12 and a torsion spring 41 is positioned inside cap 10 to interconnect the top spring mount 35 on handle cover 12 and the bottom spring mount 37 on sleeve 14.

An annular sealing ring such as O-ring sealing gasket 43 is mounted in an annular channel 44 (see FIG. 5) formed in an axially inner end of core 18. Annular sealing ring 43 is designed to be compressible in radial directions relative to axis 42 during installation of cap 10 in filler neck 22.

The lower portion 18 of closure body 19 is formed to include two pairs of spaced-apart first and second latch-receiving notches 51 and 52 as shown best in FIGS. 2, 4, 5-8, 10, and 11. The anti-rotation latches 38 are appended to upper portion 24 of closure body 19 and configured to cause each of the anti-rotation latches 38 to engage one of the first latch-receiving notches 51 to establish a first position of upper portion 24 relative to lower portion 18 as shown, for example, in FIGS. 6-8 and to engage one of the second latch-receiving notches 52 to establish a second position of the upper portion 24 relative to lower portion 18 as shown, for example, in FIG. 11.

Figure 5:
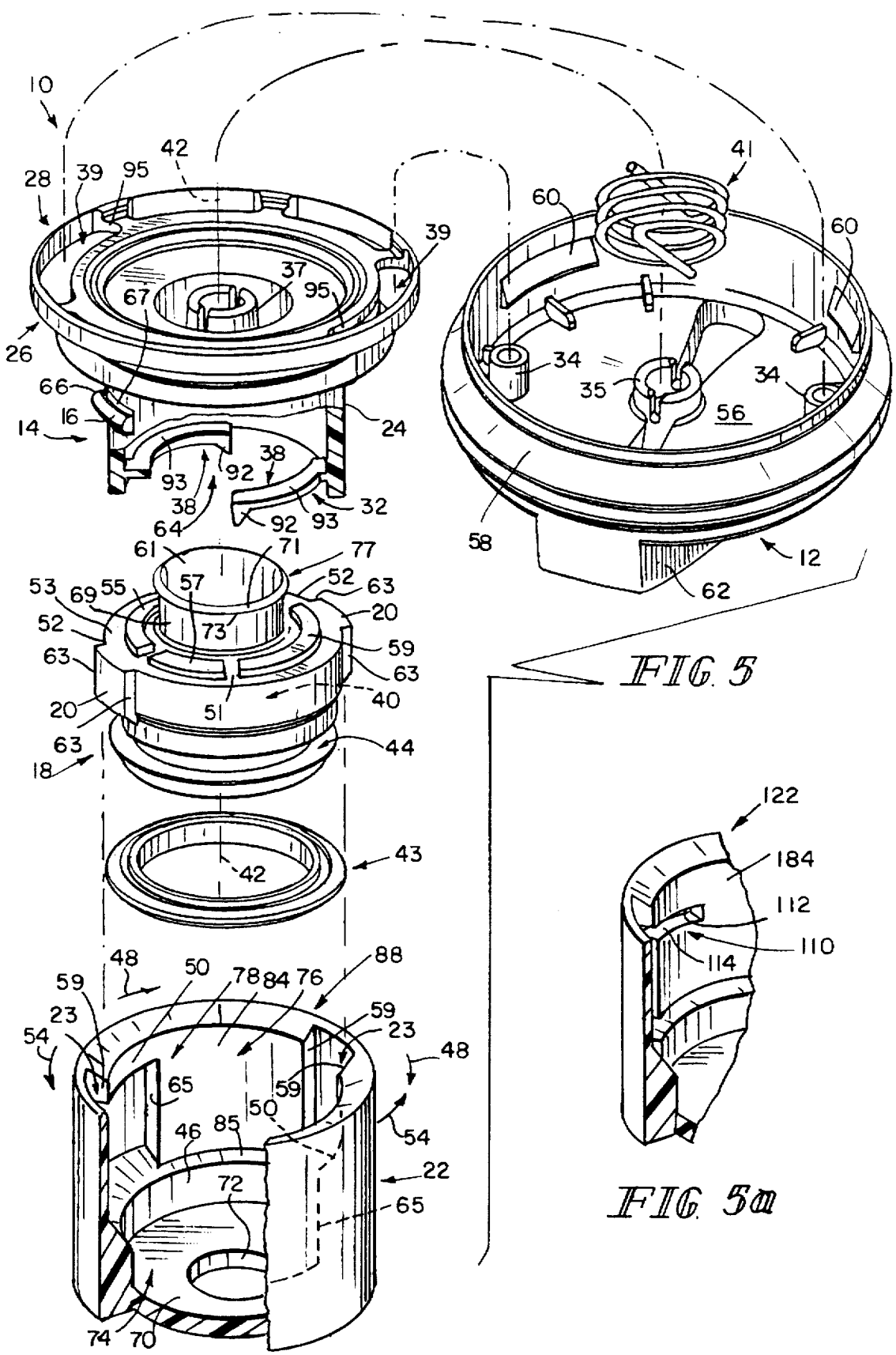
FIG. 5 is an exploded perspective view of a preferred embodiment of a quick-on cap in accordance with the present invention showing a filler neck including an upper region formed to include a pair of vertical guide channels and internal mounting flanges communicating with the guide channels for engaging retaining lugs appended to the upper portion of the closure body, an O-ring sealing gasket, a lower portion of the closure body formed to include an annular channel for receiving the O-ring sealing gasket, a pair of radially outwardly projecting anti-rotation ribs, and several upwardly facing latch-receiving notches, an upper portion of the closure body formed to include a pair of annular downwardly facing anti-rotation latches, one of two radially outwardly projecting retaining lugs, and an axially outer face formed to include two spaced-apart annular lost-motion drive slots, a handle cover including two cylindrical drive lugs arranged to extend into the two annular lost-motion drive slots upon connection of the handle cover to the upper portion of the closure body, and a torsion spring for interconnecting the handle cover and the upper portion of the closure body.

As shown in FIG. 5, lower portion 18 includes a top wall 53 and four segments 55, 57, 59, and 61 (shown in phantom) appended to top wall 53. Each segment 55, 57, 59, and 61 has an annular shape and is positioned to lie in radially spaced-apart relation to axis 42 as shown in FIG. 5. Each first latch-receiving notch 51 is formed between two adjacent segments and each second latch-receiving notch 52 is formed between two adjacent segments.

Lower portion 18 includes a suspension flange 77 for engaging a support flange 79 appended to upper portion 14 as shown, for example, in FIG. 6. As shown in FIGS. 5 and 6, suspension flange 77 includes a cylindrical base 69 appended to top wall 53 and an annular lip 71 appended to a top perimeter edge of cylindrical base 69 and formed to include an axially downwardly facing surface. Support flange 79 includes several axially downwardly extending arms 75 configured to engage the axially downwardly facing surface 73 of annular lip 71 on suspension flange 77 to establish coupling 61 to couple axially lower portion 18 of closure body 19 to axially upper portion 24 of closure body 19 for relative rotational movement therebetween as shown, for example, in FIGS. 6-8, 10, and 11. As shown best in FIG. 6, suspension flange 77 including cylindrical base 69 and annular lip 71 is positioned to lie in the interior region formed in upper portion 24 when suspension flange 77 is coupled to support flange 79.

It will become clear as this description progresses that the arc length of annular lost-motion drive slots 39 controls the amount of "lost motion" generated in cap 10 during a first stage of cap removal before a direct-drive driving connection is established during a second stage of cap removal. In addition, the torsion spring 41 functions to turn sleeve 14 relative to handle cover 12 each time cap 10 is removed from filler neck 12 to "reset" the cap 10 automatically so that proper "in-line" alignment of retaining lugs 16 on sleeve 14 and anti-rotation ribs 20 on underlying core 18 is established before each cap-installation activity.

In use, quick-on cap 10 is easily installed on filler neck 22 to establish a fuel vapor seal between the cap 10 and filler neck 22 by taking the cap 10 shown in FIG. 1, inserting it axially into the filler neck 22 as shown diagrammatically in FIG. 2 to position the annular sealing ring 43 carried on the axially inner end of core 18 opposite to an annular wall 46 on filler neck 22, and then rotating the handle cover 12 one-twelfth of a revolution (30°) about axis 42 in a clockwise or cap-installation direction 48. Such rotation of handle cover 12 rotates the sleeve 14 relative to core 18 to move retaining lugs 16 into engagement with internal flanges 50 formed in filler neck 22. Ribs 20 on core 18 function as anti-rotation ribs because they engage other internal flanges defined by vertical guide channels 23 formed in filler neck 22 to block rotation of core 18 relative to filler neck 22 during rotation of handle cover 12 and sleeve 14 relative to filler neck 22. At the same time, rotation of sleeve 14 about axis 42 rotates the anti-rotation latches 38 relative to the underlying core 18 from engagement with a first notch 51 shown in FIG. 2 to engagement with a second notch 52 shown in FIG. 4.

The embodiment of filler neck 22 in FIG. 5 shows that mounting flanges 50 lie above an undercut formed in the interior side wall 84 of filler neck 22. An alternative embodiment of filler neck 22 is shown in FIG. 5a, wherein the side wall 184 of filler neck 122 is formed to include a helical slot 110 for receiving a helical retaining lug on sleeve 14 similar (but helical) to retaining lug 66. A "helical" ramp 112 is thus provided above helical slot 110 and a helical ramp 114 is provided below helical slot 110 to engage and cam a helical retaining lug (not shown) on sleeve 14 during installation and removal of cap 10.

Cap 10 is easily removed from filler neck 22 during refueling by rotating handle cover 12 about axis of rotation 42 through a first "lost-motion" stage and then through a second "direct-drive" stage. The angular duration of the first lost-motion stage is set by the arc length of annular lost-motion drive slots 39. The arc length of slots 39 should be increased to increase lost-motion and decreased to decrease lost-motion.

First, cap 10 is twisted one-sixth of a revolution (60°) through a lost-motion angle in a counterclockwise or cap-removal direction 54. It will be understood that this is called a lost-motion stage because the user is able to rotate handle cover 12 through a 60° angle without turning sleeve 14 in filler neck 22 because the drive lugs 34 move in the annular lost-motion drive slots 39 relative to the top flange 26 of sleeve 14.

Second, cap 10 is twisted one-twelfth of a revolution (30°) through a direct-drive angle in cap-removal direction 54. It will be understood that this is called a direct-drive stage because the sleeve 14 turns in filler neck 22 about axis of rotation 42 directly in response to rotation of handle cover 12 through a 30° angle. Now, each retaining lug 16 is withdrawn from its cap-anchoring position engaging the internal flange 50 formed in the filler neck 22 (or helical slot 110 in the embodiment of FIG. 5a) and returned to a position in the vertical guide channel 23 formed in filler neck 22.

The cap 10 is now in a position where it can be withdrawn easily from the mouth of the filler neck 22. Once the cap 10 is withdrawn, the wound torsion spring 41 "unwinds" and rotates the sleeve 14 relative to handle cover 12. This snap-back action resets the cap 10 from the configuration shown in FIG. 3 to the configuration shown in FIG. 1. Essentially, the sleeve 14 rotates about axis of rotation 42 so that the drive lug 34 now engages a drive wall 55 in top flange 26 of sleeve 14 as shown in FIG. 1 to establish a direct-drive driving connection that functions during cap installation.

Figure 3:
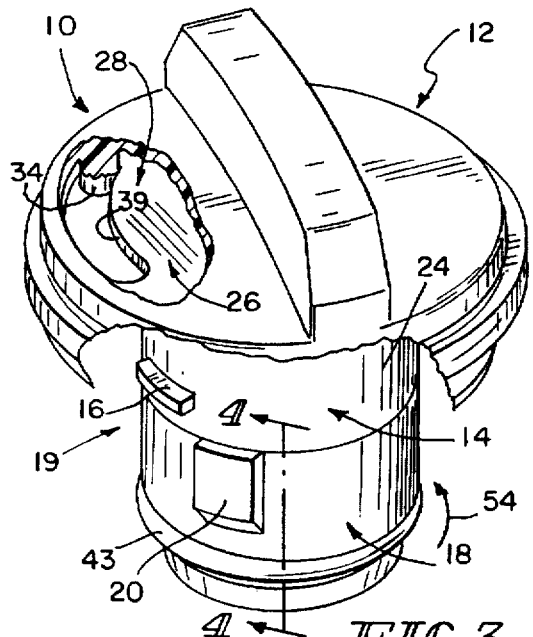
FIG. 3 is a perspective view of the cap of FIG. 1 as it would appear in the filler neck during cap installation after the handle cover has been rotated one-twelfth of a turn (30°) in a cap-advancing direction relative to the filler neck using the direct-drive driving connection to rotate the retaining lugs on the upper portion of the closure body relative to the anti-rotation ribs on the lower portion of the closure body into engagement with internal flanges in the filler neck to anchor the closure body in the filler neck and trap the O-ring sealing gasket radially between the closure body and the filler neck.

An exploded perspective view of the quick-on cap 10 of FIGS. 1 and 3 is provided in FIG. 5, to illustrate a referred embodiment of the various components in the cap 10. Handle cover 12 includes a circular top wall 56, annular perimeter side wall 58, a plurality of radially inwardly projecting lugs 60, and a hollow grip handle 62 formed to include an elongated axially inwardly opening channel extending across the diameter of the circular top wall 56. The handle cover 12 is used in the manner described below to rotate the sleeve 14 because of a coupling between handle cover 12 and sleeve 14.

Sleeve 14 is preferably formed as illustrated in FIGS. 5 and 6 so that the axially extending cylindrical body 24 includes an annular interior side wall defining a cylindrical inner chamber below bottom spring mount 37 and means 61 for coupling to core 18. The cylindrical body 24 also includes an annular exterior side wall and the two annular retaining lugs 16 are formed to lie in spaced-apart relation to one another about the circumference of the exterior side wall. A concentric core-receiving aperture 64 is formed in the bottom of sleeve 14 as shown in FIG. 5.

Core 18 is preferably formed as illustrated in FIGS. 5 and 6 to include an axially extending tubular body that is sized to fit through the core-receiving aperture 64 formed in the inner end 32 of sleeve 14 and extend into a cylindrical inner chamber formed in sleeve 14. The two anti-rotation ribs 20 are appended to an exterior wall of core 18 and arranged to lie in spaced-apart relation around the circumference of the exterior wall. Each anti-rotation rib 20 includes a pair of stop faces 63 for engaging internal flanges 59 in the vertical guide channel 23 formed in the filler neck 22 to limit rotation of sleeve 14 in filler neck 22. Each retaining lug 16 includes a stop face 66 for engaging another internal flange 65 (FIG. 5 in the filler neck to limit rotation of sleeve 14 in filler neck 22 and an anchor face 67 for engaging internal flange 50 (helical ramp 112 in the embodiment of FIG. 5a) in the filler neck 22 to block withdrawal of the sleeve 14 from the filler neck 22.

Figure 11:
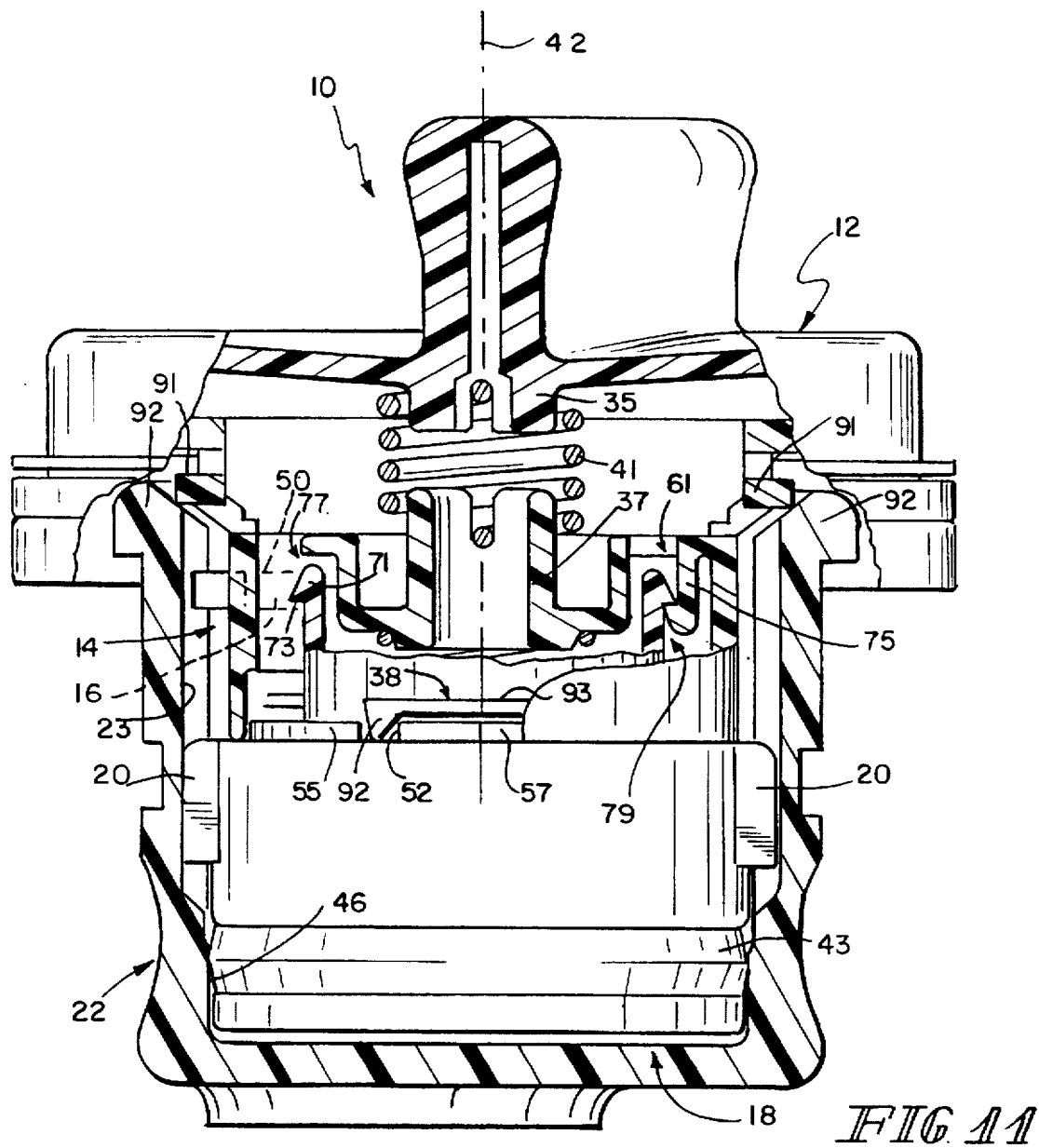
FIG. 11 is a view similar to FIGS. 7, 8, and 10 showing the quick-on cap in its fully installed position in the filler neck wherein the anti-rotation ribs on the lower portion of the closure body remain in the vertical guide channels formed in the filler neck, the retaining lugs appended to the upper portion of the closure body lie in the undercut formed in the filler neck and engage internal horizontal flanges formed in the filler neck to block axial removal of the cap from the filler neck, and the fingers on the anti-rotation latches appended to the upper portion of the closure body extend downwardly to engage second notches formed in the lower portion of the closure body to block rotation of the upper portion of the closure body relative to the underlying lower portion of the closure body.
Figure 12:
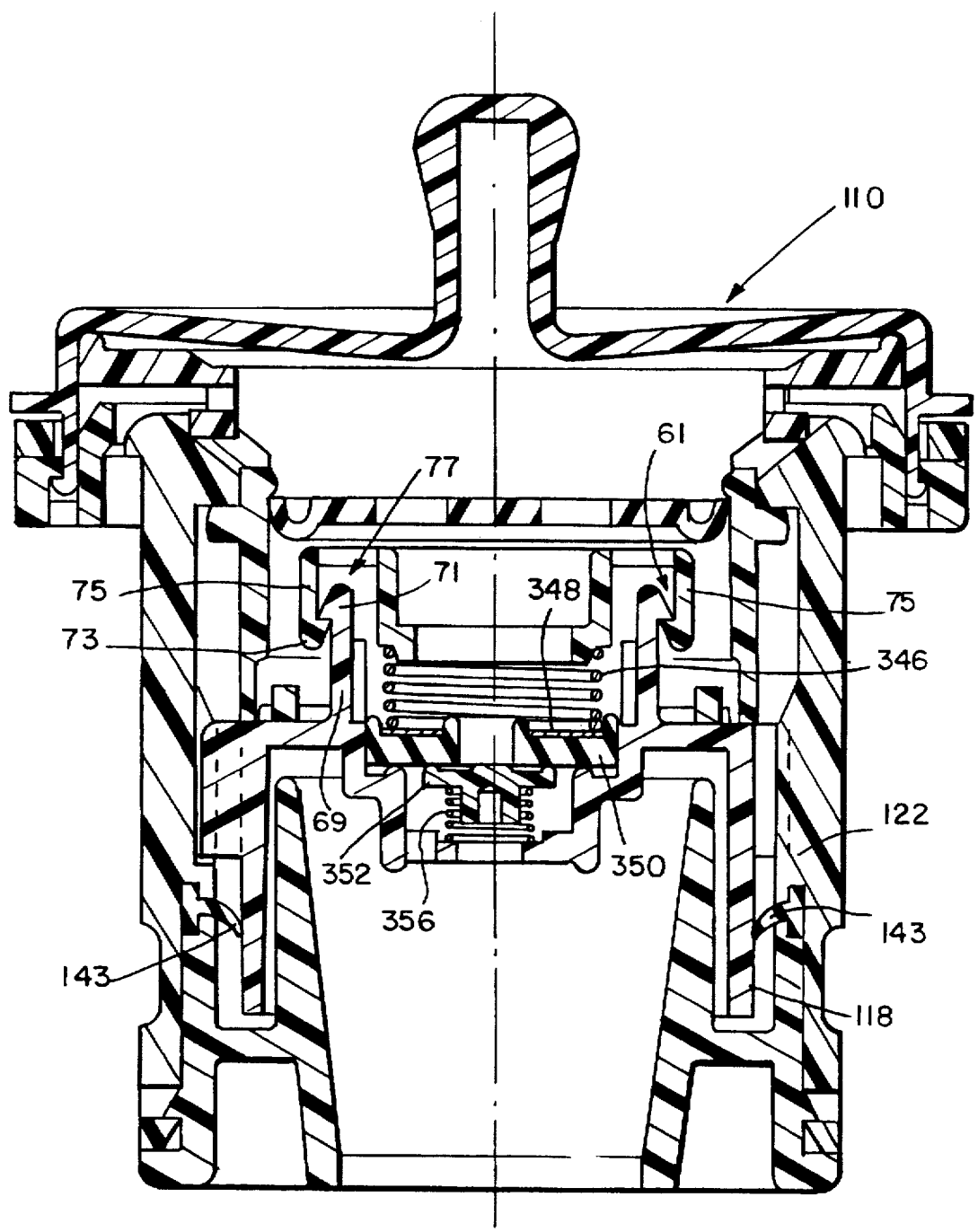
FIG. 12 is a sectional view of the quick-on cap and filler neck in accordance with another embodiment of the present invention showing an O-ring sealing gasket mounted in a stationary position of the filler neck instead of being mounted on the cap.

A pressure-relief valve assembly and a vacuum-relief valve assembly are mounted in the interior region of a central portion of core 18 to control flow of fuel vapor out of the filler neck 22 and atmospheric air into the filler neck 22. These assemblies are shown, for example, in the embodiment of FIG. 12. Pressure-relief valve assembly includes pressure-relief spring 346, annular valve plate 348, and pressure-relief valve 350. Vacuum-relief valve assembly includes vacuum-relief valve 352 and vacuum-relief spring 356. The pressure-relief valve assembly 342 is mounted inside core 18 in a position underneath the bottom spring mount 37 as shown in FIG. 11. The vacuum-relief valve assembly is mounted in an interior region formed in a receptacle appended to core 18 as shown in FIG. 12.

Filler neck 22 is shown in detail in FIG. 5. Filler neck 22 is a molded plastic insert that is designed to be installed in an outermost end of a fuel tank fill tube (not shown). Means such as matching threads, mounting flanges, and/or other fasteners (not shown) can be used to fix filler neck 22 in place in such a fuel tank fill tube (not shown). A partition wall 70 is formed in filler neck 22 to include an aperture 72 sized to receive an unleaded fuel-dispensing nozzle (not shown) of the type used to pump fuel into a fill tube.

As shown, for example, in FIGS. 5 and 6, filler neck 22 includes a lower interior region 74 that is configured to establish a tight seal with O-ring sealing gasket 43 upon installation of cap 10 in a fully installed position in filler neck 22. Filler neck 22 also includes an upper interior region 76 that is formed to include means 78 for receiving, guiding, and retaining the anti-rotation ribs 20 on core 18 and retaining lugs 16 on sleeve 14 so that cap 10 is retained in its fully installed position in filler neck 22.

Lower interior region 74 of filler neck 22 includes a reduced internal diameter fill passageway 80 defined by cylindrical interior wall 46. Cylindrical interior wall 46 has an internal diameter sized to cause a tight annular seal to be established between wall 46 and O-ring sealing gasket 43 upon insertion of the axially inner end of core 18 carrying gasket 43 into the fill passageway 80 formed in lower interior region 74 of filler neck 22.

Upper interior region 76 of filler neck 22 includes an annular side wall 84 that is formed to include internal flanges that define slots for receiving and guiding the anti-rotation ribs 20 on core 18 and the two retaining lugs 16 that are appended to sleeve 14. A conical necked-down interior wall 85 interconnects larger diameter annular side wall 84 to smaller diameter annular side wall 46. A vertical (i.e., axially extending) guide channel 23 is provided for receiving each of the ribs 20 and lugs 16 as the quick-on cap 10 is thrust into a cap-receiving aperture 88 formed at the axially outer end of filler neck 22. A mounting flange 50 (helical ramp 112 in the embodiment of FIG. 5a) is provided to engage each retaining lug 16 and block removal of sleeve 14 from filler neck 22 through cap-receiving aperture 88. An anti-rotation finger 92 is provided on an annular deflectable arm 93 included in each anti-rotation latch 38 to engage second notches 52 formed in core 18 to block rotation of retaining lugs 16 from a fully installed position engaging mounting flanges 50 to a partly installed position lying in the vertical guide slots 23.

A sequence motion of movement to cause quick-on cap 10 to be fully installed in filler neck 22 is summarized below with reference to FIGS. 6–11. Referring to FIG. 6, quick-on cap 10 is first positioned above cap-receiving aperture 88 formed in filler neck 22 and is oriented so that it extends vertically along axis 42. In this position, anti-rotation ribs 20 on core 18 and retaining lugs 16 on sleeve 14 are positioned directly above openings into the pair of spaced-apart vertical guide channels 23 formed in upper region 76 of filler neck 22. A pair of dotted-line paths 86 and 87 are illustrated in FIG. 6 to show the paths that the left-side and right-side sets of ribs 20 and lugs 16 will follow during installation of quick-on cap 10 into filler neck 22 in direction 90 in FIG. 6.

Figure 7:
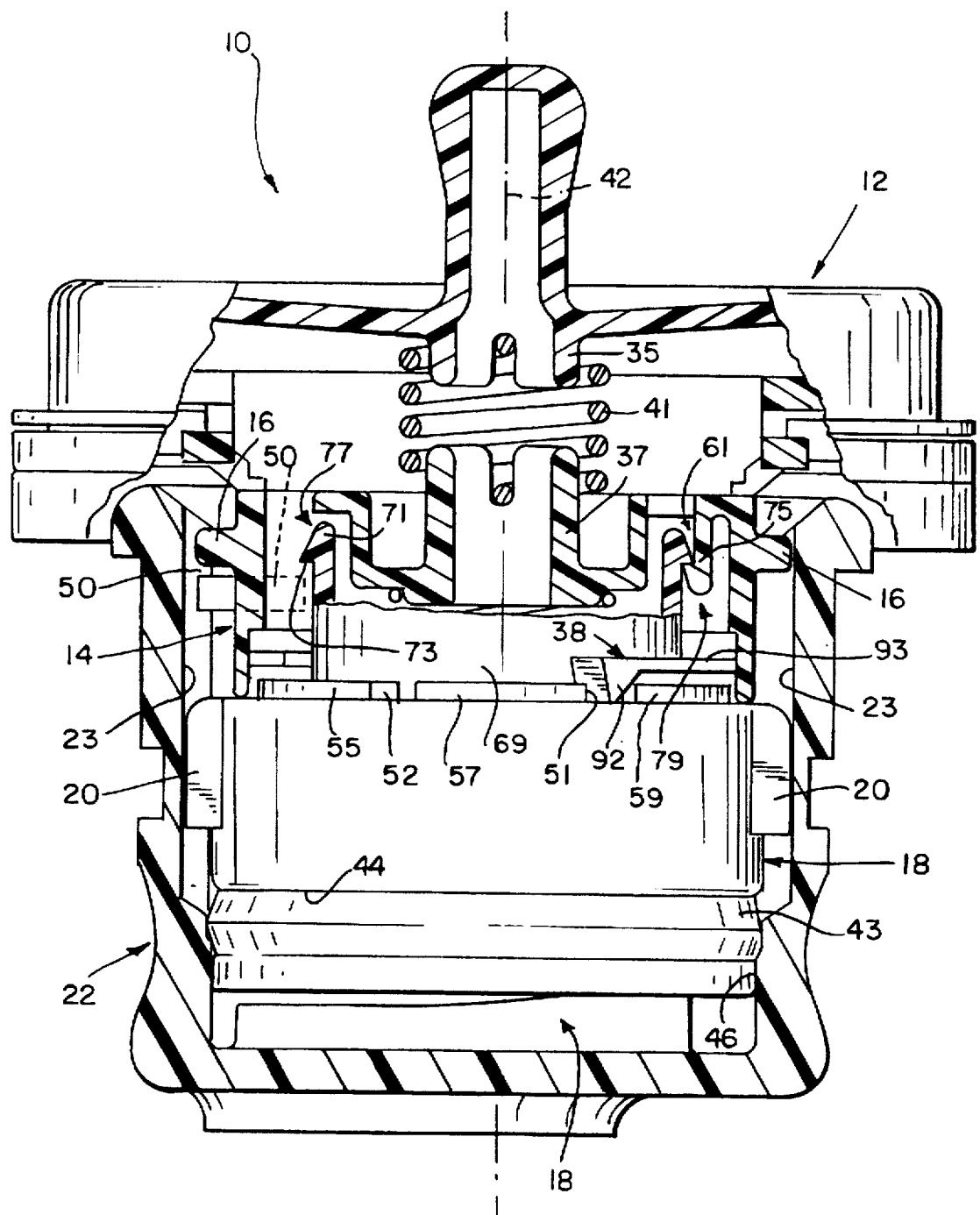
FIG. 7 is a view similar to FIG. 6 showing insertion of the cap into the filler neck and placement of the anti-rotation ribs and the overlying retaining lugs in the vertical guide channels formed in the filler neck during a first stage of cap installation and showing that a "right-side" anti-rotation latch on the upper portion of the closure body engages a first notch formed in the lower portion of the closure body during this first stage of cap installation.

Axially inward movement of quick-on cap into filler neck 22 is shown in FIG. 7. At the point shown in FIG. 7, anti-rotation ribs 20 on core 18 and retaining lugs 16 on sleeve 14 are engaged in vertical guide channels 23 formed in the filler neck to cause quick-on cap 10 to be guided along the axial path 42 as it is inserted in filler neck 22. Because of the axial motion guiding constraint provided by vertical guide channels 23, a user is unable to rotate quick-on cap 10 in either clockwise or counterclockwise directions about axis of rotation 42 during initial insertion of the cap 10 into filler neck 22.

As shown in FIG. 7, during initial insertion of cap 10 into filler neck 22, annular sealing ring 43 mounted in annular channel 44 on the axially lower end of core 18 is moved into sealing engagement with the cylindrical annular wall 46 provided in the lower interior region 74 of filler neck 22. Annular sealing ring 43 is configured to have a cross section such as that shown in FIGS. 2 and 4 so that it can be radially compressed between core 18 and cylindrical wall 46 following installation of cap 10 in filler neck 22.

Referring to FIGS. 6 and 7, it will be seen that relative rotation between sleeve 14 and underlying core 18 during initial insertion of cap 10 into filler neck 22 is limited and blocked by engagement of anti-rotation latches 38 appended to sleeve 14 in notches 51 formed in core 18. In particular, the triangular finger 92 appended to a distal end of deflectable arm 93 included in anti-rotation latch 38 is positioned to engage in the notch 51 formed on an upper portion of core 18. Each finger 92 will remain in its position in notch 51 until rotation of handle cover 12 and sleeve 14 as a unit about axis 42 as shown, for example, in FIG. 10.

Figure 9:
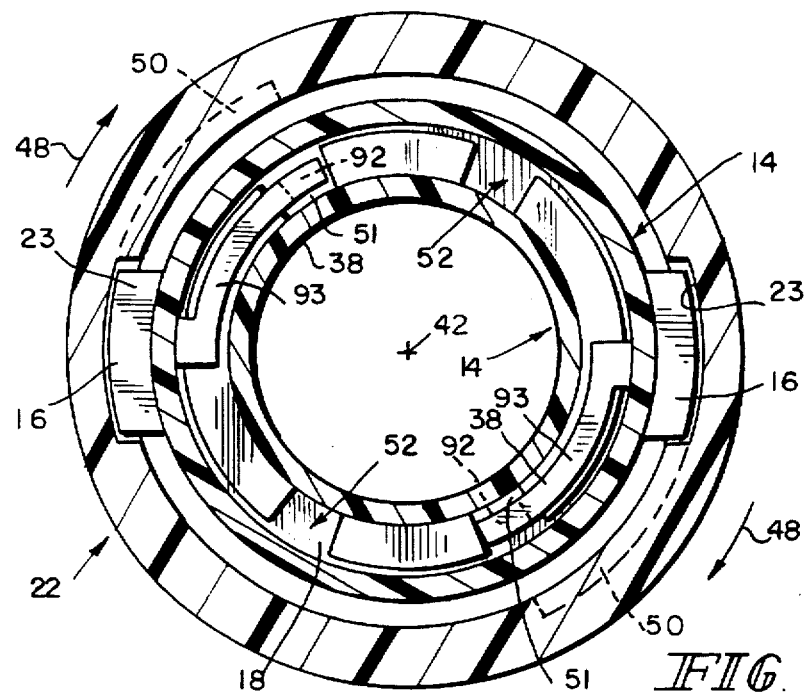
FIG. 9 is a transverse sectional view taken along line 9—9 of FIG. 8 showing placement of the retaining lugs on the upper portion of the closure body in the vertical guide channels prior to being rotated in a clockwise direction into the annular undercut (dotted lines) formed in the filler neck below the internal horizontal flange and showing placement of fingers on the anti-rotation latches in first notches formed in the lower portion of the closure body and the location of an empty pair of second notches formed in the upper portion of the closure body.
Figure 8:
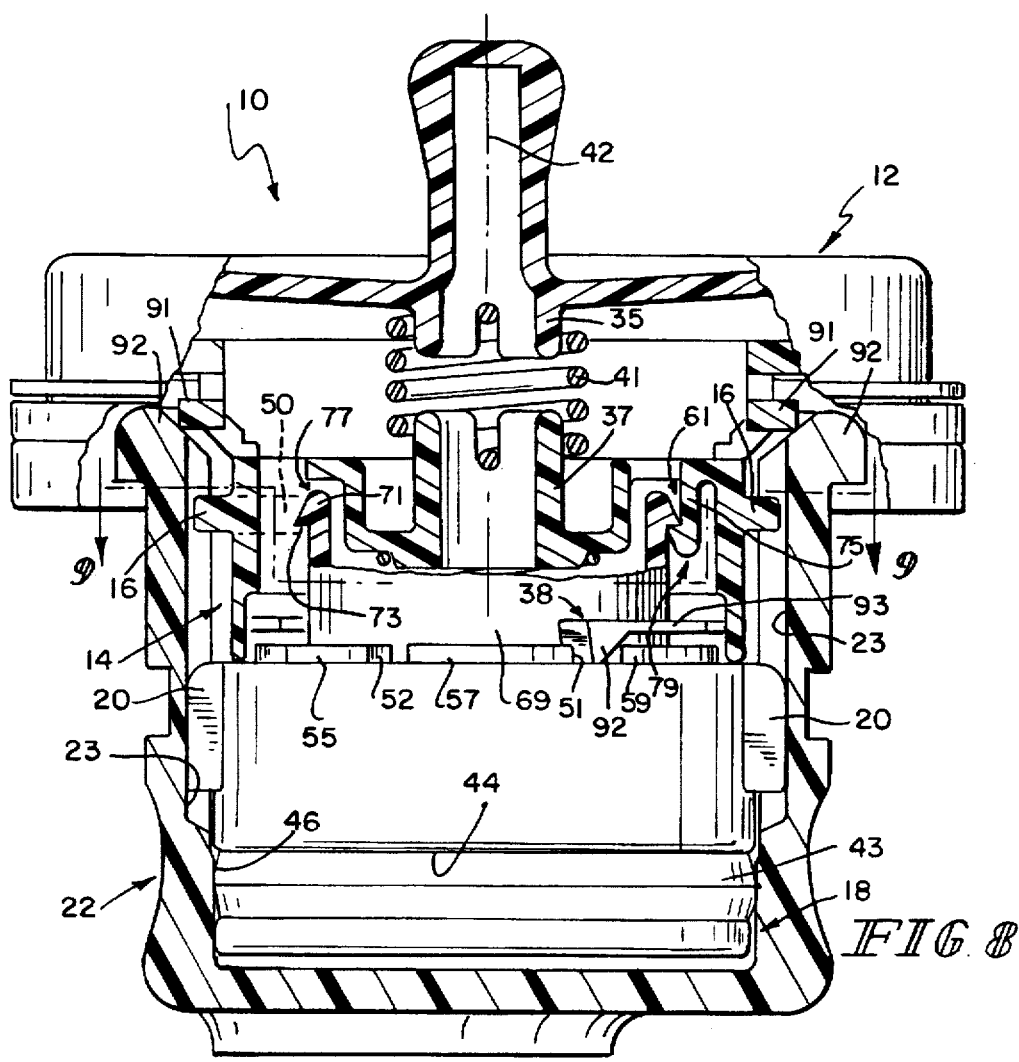
FIG. 8 is a view similar to FIG. 7 showing the cap after it has been moved axially inwardly into filler neck to a partly installed position wherein the O-ring sealing gasket sealingly engages an annular inner wall in the filler neck and the retaining lugs are positioned to be rotated from the vertical guide channels into annular undercut formed in the filler neck below an internal horizontal flange.

The initial stage of installation of quick-on cap 10 into filler neck 22 is shown in FIGS. 8 and 9 wherein the cap is fully seated in filler neck 22. In this position, retaining lugs 16 appended to sleeve 14 are positioned to lie in vertical guide channels 23 so that they can later (see FIG. 10) be rotated about axis 42 to a position underneath and in engagement with the mounting flanges 50 formed in the upper interior region of filler neck 22. As shown in FIG. 8, at this stage, finger 92 on anti-rotation latch 38 remains in engagement with notch 51 formed in core 18. An annular flange 91 on sleeve 14 has now been moved into engagement with an outer end 92 of filler neck 22 to block admission of dust or other particulate matter into filler neck 22.

Referring to FIG. 9, placement of retaining lugs 16 in an upper region of vertical guide channels 23 is shown clearly. The angular displacement of mounting flanges 50 formed in the upper interior region 76 of vertical guide channels 23 adjacent to vertical guide channels 23 is shown clearly in FIG. 9. It will be understood that rotation of sleeve 14 about axis of rotation 42 in the clockwise or cap-advancing direction 48 will cause each of retaining lugs 16 on sleeve 14 to rotate in direction 48 so that those lugs 16 leave vertical guide channels 23 and lodge underneath mounting flanges 50 (in helical slots 110 in the embodiment of FIG. 5a) formed in the upper interior region 76 of filler neck 22. At the same time, as shown in more detail in FIGS. 10 and 11, the anti-rotation latches 38 appended to sleeve 14 will rotate from the position shown in FIG. 9 to a new position wherein the finger 92 on each latch 38 will engage in the second notches 52 formed in core 18.

Figure 10:
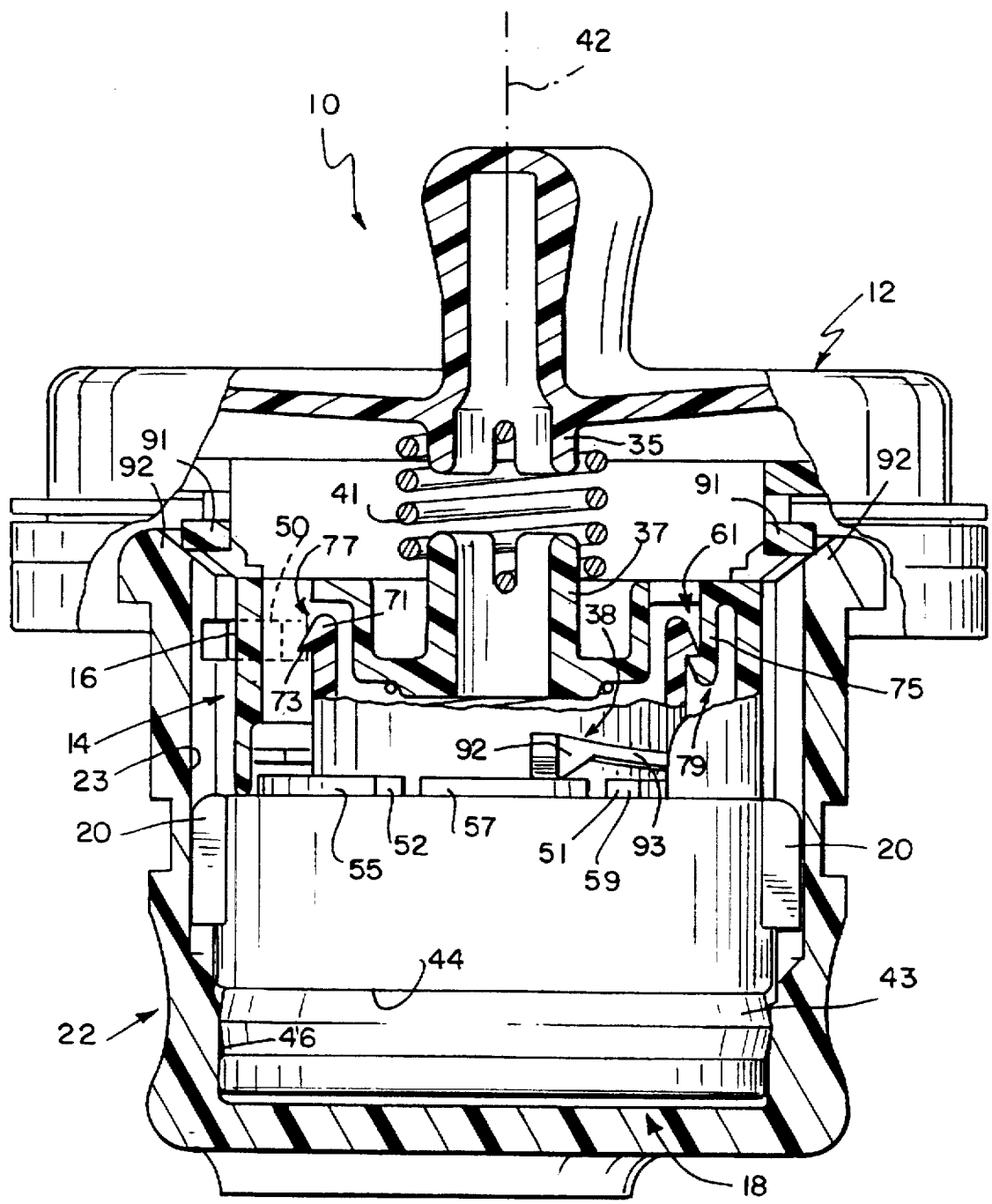
FIG. 10 is a view similar to FIGS. 7 and 8 showing rotation of the handle cover and the upper portion of the closure body as a unit to begin to move the retaining lugs appended to the upper portion of the closure body into the undercut formed in the filler neck below the internal horizontal flange and axially upward deflection of the "right-side" anti-rotation latch after it has disengaged the first notch formed in the lower portion of the closure body and is being rotated (to the left) in a direction toward a second notch formed in the lower portion of the closure body.

An initial stage of rotation of handle cover 12 about axis 42 is shown in FIG. 10. Quick-on cap 10 is automatically set to have a direct-drive driving connection between handle cover 12 and sleeve 14 during cap installation and to have a lost-motion driving connection between handle cover 12 and sleeve 14 during cap removal. Such a cap 10 is easy to install yet incorporates a lost-motion feature that functions to prevent loss of cap seal if the handle cover 12 is rotated inadvertently in a cap-removal direction during vehicle impact or during stress relief of vehicle components. Torsion spring 41 provides a direct-drive driving connection before and during cap installation without disrupting a lost-motion driving connection that is established between handle cover 12 and sleeve 14 during an initial stage of cap removal.

During initial rotation of handle cover 12 about axis 42 as shown in FIG. 10, the cylindrical drive lugs 34 appended to underside 56 of handle cover 12 engage drive walls 95 (FIG. 5) formed in sleeve 14 at one end of each of the annular lost-motion drive slots 39 to transmit torque from handle cover 12 to sleeve 14. As shown in FIG. 10, such rotation of handle sleeve 14 causes deflection of each latch arm 93 and disengagement of each latch finger 92 from the first notch 51 formed in an upper surface on core 18. As sleeve 14 continues to rotate about axis 42 along with handle cover 12, these latch fingers 92 are rotated to move in a direction toward subsequent engagement with second notch 52 also formed in an upper portion of core 18. As shown in FIG. 10, during rotation of handle cover 12 and sleeve 14 as a unit, underlying core 18 remains in a rotationally fixed position due to engagement of anti-rotation ribs 20 on core 18 in the vertical guide channels 23 formed in filler neck 22. Since core 18 carries annular sealing ring 43, such annular sealing ring 43 will not be rotated or abraded during rotation of sleeve 14 about axis 42 to place retaining lugs 16 in engagement with mounting flanges 50 formed in the upper interior region 76 of filler neck 22.

Rotation of handle cover 12 and sleeve 14 about axis 42 to a fully installed position is shown in FIG. 11. At this point, retaining lugs 16 have been fully rotated into engagement with the mounting flanges 50 formed in the upper interior region 76 of filler neck 22. Also, the latch fingers 92 on latch arms 93 have been moved into engagement in the second notches 52 formed in core 18 so as to limit or block incidental rotation of handle cover 12 and sleeve 14 about axis 42 relative to underlying core 18. As shown in both FIGS. 10 and 11, the annular dust shield 91 formed on sleeve 14 continues to engage an outer end 92 of filler neck 22 to block admission of dust or other particulate matter into filler neck 22 when the cap is in being rotated to and then finally reaches its fully installed position on filler neck 22.

Each time the quick-on cap 10 is removed from filler neck 22, it instantly and automatically "resets" itself so that a direct-drive driving connection between the handle cover 12 and the sleeve 14 is established to facilitate reinstallation of the quick-on cap 10 on the filler neck 22. This reset function is achieved by automatic operation of the torsion spring 41 to rotate the sleeve 14 relative to the handle cover 12.

Upon removal of the cap 10 from filler neck 22, while the user is still gripping the cap 10 by holding onto the handle cover 12, the torsion spring 41 inside the cap 10 functions to rotate the sleeve 14 about the axis of rotation 42 relative to handle cover 12 until the drive lugs 34 on the handle cover 12 engage drive walls 95 in the drive slots 39 formed in the sleeve 14. This lug-to-wall engagement establishes a direct-drive driving connection between the handle cover 12 and the sleeve 14 for use during cap installation. In other words, the torsion spring 41 applies a spring force which biases the drive lugs 34 against the drive walls 95 to establish a direct-drive driving connection automatically before and during each cap installation. One benefit to the user of such a direct-drive feature is that any rotation of the handle cover 12 in a cap-advancing direction 48 by the user during cap installation will cause the sleeve 14 to turn in the filler neck 22 so that the user can positively and quickly install the quick-on cap in the filler neck 22 without any "lost motion" between the handle cover 12 and the sleeve 14.

Advantageously, torsion spring 41 provides a direct-drive driving connection before and during cap installation without disrupting a lost-motion driving connection that is established between the handle cover 12 and the sleeve 14 during an initial stage of cap removal. The annular sealing ring 43 is mounted on core 18 and trapped between the core 18 and the filler neck 22 upon insertion of the core 18 to its tightened filler neck-closing position shown in FIGS. 8–11. When the handle cover 12 is initially rotated by a user in a counterclockwise cap-removal direction 54, the handle cover 12 is permitted to rotate through a predetermined "lost-motion" angle, e.g., 60°, relative to the sleeve 14 before establishing a direct-drive driving connection therewith to delay breaking a seal between the core 18 and the filler neck 22. Once the direct-drive driving connection is established, further counterclockwise rotation of the handle cover 12 will cause the sleeve 14 to rotate in the filler neck 22 to position retaining lug 16 back in the vertical guide channels 23 formed in filler neck 22. At this point, the user can withdraw quick-on cap 10 in an axially outward direction from filler neck 22 so as to break the seal established between annular sealing ring 43 and filler neck 22. This "lost-motion" feature advantageously aids in increasing the crashworthiness of the quick-on cap 10 by lessening the likelihood that the cap 10 will loosen an amount sufficient to break the seal during an accidental impact.

Another embodiment of the invention is shown in FIG. 12. The structure of the cap 110 shown in this embodiment is very similar to the structure of the quick-on cap 10 shown in the previous figures. However, in this case, an annular sealing ring 143 is mounted in filler neck 122 instead of on core 118. As noted previously, the pressure-relief and vacuum-relief structure shown in FIG. 12 is suitable for use in connection with the embodiment shown in the preceding figures.

The quick-on cap 10 disclosed herein uses a radial-type seal positioned low in filler neck 22 in a region away from the cap-to-filler neck outer interface area. The filler neck 22 in the lower area 74 is very resistant to damage and deflection. The handle cover 12 and the sleeve 14 rotate as a unit during installation and removal with lost motion provided between handle cover 18 and sleeve 14 in a preferred embodiment. In an alternative embodiment (not shown), a direct-drive driving connection is always established between handle cover 12 and sleeve 14.

In the illustrated embodiment, core 18 is prevented from rotating by neck guides 23 which allow axial movement only. The O-ring seal 43 is therefore not exposed to any rotational or twisting moment during installation or removal, only radial compression. Torque arm 38 between sleeve 14 and core 18 provide the installed detent "field" and the anti-removal "latch." In the embodiment illustrated in FIG. 5, the operator provides the axial in or out force required for installation or removal directly with torque provided for latching only. In the variation shown in FIG. 5a, angular or spiral neck-retaining lugs provided by helical slot 110 produced the axial force required for cap installation. A component of axial cap removal force is provided by the lower helical ramp 114 in addition to force provided directly by the operator.

Although this invention has been described in detail with reference to certain embodiments, variations and modifications exist within the scope and spirit of the invention as described and as defined in the following claims.

We claim:

1. A cap for use in the filler neck of a tank, the cap comprising
   a handle,
   an O-ring sealing gasket, and
   a closure body including an upper portion coupled to the handle and a-lower portion rotatably coupled to the upper portion for rotation about an axis of rotation, the O-ring sealing gasket being mounted on the lower portion for movement therewith, the lower portion being formed to include spaced-apart first and second latch-receiving notches, the closure body further including an anti-rotation latch appended to the upper portion and configured to engage the first latch-receiving notch to establish a first position of the upper portion relative to the lower portion and to engage the second latch-receiving notch following predetermined rotation of the upper portion relative to the lower portion about the axis of rotation to establish a second position of the upper portion relative to the lower portion.

2. The cap of claim 1, wherein the anti-rotation latch includes a deflectable arm having a first end appended to the upper portion and a distal second end.

3. The cap of claim 2, wherein the anti-rotation latch further includes an anti-rotation finger appended to the distal second end and oriented to extend downwardly in a direction parallel to the axis of rotation to engage the first latch-receiving notch upon movement of the upper portion relative to the lower portion to assume the first position and to engage the second latch-receiving notch upon movement of the upper portion relative to the lower portion to assume the second position.

4. The cap of claim 3, wherein the deflectable arm has an annular shape and is arranged to curve about the axis of rotation.

5. The cap of claim 2, wherein the deflectable arm has an annular shape.

6. The cap of claim 5, wherein the anti-rotation latch further includes an anti-rotation finger appended to the distal second end of the annular deflectable arm.

7. The cap of claim 2, wherein the upper portion includes a cylindrical body having an axially upper end and an axially lower end and the first end of the deflectable arm is appended to the axially lower end.

8. The cap of claim 7, wherein the cylindrical body is formed to include an interior region, a support flange positioned to lie in the interior region, the axially lower end is formed to include an opening into the interior region, the axially lower portion includes a suspension flange positioned to lie in the interior region of the cylindrical body and engage the support flange to couple the axially upper portion to the axially lower portion for relative rotational movement therebetween.

9. The cap of claim 7, wherein the cylindrical body includes an interior wall defining an interior region and the first end of the deflectable arm is appended to the interior wall to position the distal second end of the deflectable arm to lie in the interior region.

10. The cap of claim 1, wherein the axially lower portion includes an annular surface facing toward the axially upper portion and engaging the anti-rotation latch during rotation of the upper portion relative to the lower portion and the annular surface is formed to include the first latch-receiving notch and the second latch-receiving notch in circumferentially spaced-apart relation to the first latch-receiving notch.

11. The cap of claim 10, wherein the axially lower portion includes a top wall and at least three segments appended to the top wall and arranged to define said annular surface facing toward the axially upper portion, a first and second of the three segments are arranged in spaced-apart relation to define the first latch-receiving notch therebetween, and the second and a third of the three segments are arranged in spaced-apart relation to define the second latch-receiving notch therebetween.

12. The cap of claim 11, wherein each of the three segments have an annular shape.

13. The cap of claim 10, wherein the anti-rotation latch includes a deflectable arm having a first end appended to the axially upper portion and a distal second end and an anti-rotation finger appended to the distal second end and positioned to engage the annular surface and each of the latch-receiving notches formed in the annular surface upon rotation of the axially upper portion relative to the axially lower portion.

14. The cap of claim 1, wherein the closure body further includes closure retainer apparatus appended to the axially upper portion and configured to engage the filler neck to block removal of the closure body from the filler neck upon installation of the cap in the filler neck.

15. The cap of claim 14, wherein the axially upper portion includes a cylindrical body having an axially upper end, an axially lower end, and a middle portion therebetween, the anti-rotation latch is appended to the axially lower end, the closure retainer apparatus is appended to the middle portion, and the axially upper portion further includes an axially outer flange coupled to the axially upper end of the cylindrical body and to the handle.

16. The cap of claim 15, wherein the axially outer flange is formed to include an annular slot, the handle is rotatable about the axis of rotation and includes a wall and a drive lug coupled to the wall and arranged to extend into the annular slot to engage the axially outer flange at a first driven surface, and further comprising a torsion spring coupled to the handle and to the axially upper portion to yieldably urge the drive lug of the handle in the annular slot into engagement with the first driven surface of the axially outer flange to establish a direct-drive driving connection between the handle and the closure body during cap installation.

* * * * *